(12) United States Patent
Morishita et al.

(10) Patent No.: US 8,034,456 B2
(45) Date of Patent: Oct. 11, 2011

(54) SURFACE-TREATED METAL MATERIAL AND METAL SURFACE TREATMENT AGENT

(75) Inventors: Atsushi Morishita, Tokyo (JP); Masahiro Fuda, Tokyo (JP); Hiroshi Kanai, Tokyo (JP); Hiroshi Kosuge, Suita (JP); Tsutomu Tawa, Takarazuka (JP)

(73) Assignees: Nippon Steel Corporation, Tokyo (JP); Mitsui Chemicals, Inc., Tokyo (JP)

( * ) Notice: Subject to any disclaimer, the term of this patent is extended or adjusted under 35 U.S.C. 154(b) by 457 days.

(21) Appl. No.: 12/308,538

(22) PCT Filed: Jun. 22, 2007

(86) PCT No.: PCT/JP2007/062633
§ 371 (c)(1),
(2), (4) Date: Jan. 9, 2009

(87) PCT Pub. No.: WO2007/148801
PCT Pub. Date: Dec. 27, 2007

(65) Prior Publication Data
US 2010/0233490 A1    Sep. 16, 2010

(30) Foreign Application Priority Data

Jun. 23, 2006 (JP) ................... 2006-174578
May 22, 2007 (JP) ................... 2007-135983

(51) Int. Cl.
*B32B 15/095* (2006.01)
*C08L 83/08* (2006.01)

(52) U.S. Cl. .................... 428/425.8; 524/488

(58) Field of Classification Search ............... 428/423.1; 423/425.8; 524/247, 417, 506, 588
See application file for complete search history.

(56) References Cited

U.S. PATENT DOCUMENTS

| | | | |
|---|---|---|---|
| 6,313,335 | B1 | 11/2001 | Roberts et al. |
| 6,875,479 | B2 * | 4/2005 | Jung et al. ............. 427/493 |
| 2004/0121162 | A1 | 6/2004 | Yamaoka et al. |
| 2004/0176518 | A1 | 9/2004 | Okamoto et al. |
| 2005/0031790 | A1 | 2/2005 | Jackson et al. |

FOREIGN PATENT DOCUMENTS

| | | |
|---|---|---|
| JP | S53-47774 | 12/1978 |
| JP | S58-31390 | 7/1983 |
| JP | H04-293789 | 10/1992 |
| JP | H06-7950 | 2/1994 |
| JP | H06-71579 | 9/1994 |
| JP | 2001-019902 | 1/2001 |
| JP | 2001-59184 | 3/2001 |
| JP | 2001-164182 | 6/2001 |
| JP | 2001-181855 | 7/2001 |
| JP | 2001-234119 | 8/2001 |
| JP | 2001-524558 | 12/2001 |
| JP | 2002-363484 | 12/2002 |
| JP | 2003-027256 | 1/2003 |
| JP | 2006-052462 | 2/2006 |
| RU | 2 293 750 | 10/2005 |
| RU | 2004 110 933 | 10/2005 |
| RU | 2005 129 573 | 3/2006 |

OTHER PUBLICATIONS

Decision of Grant issued in Russian Patent Application No. 2008151770, dated Sep. 29, 2010, with English translation thereof.
International Search Report dated Aug. 7, 2007 issued in corresponding PCT Application No. PCT/JP2007/062633.
Hiroshi Kanai, "Suisei Toso no Jitsuyoka to Usukohan Toso eno Tekiyo", Toso Gijutsu, Feb. 1, 2002, vol. 41, No. 2, pp. 58 to 62.
Yoichiro Mori, Makoto Yamazaki, Hidetoshi Shinto, "Junkatsu Koban no Himaku Sekkei", Current advances in materials and processes, Sep. 1998, vol. 11, No. 6, p. 1215.

* cited by examiner

*Primary Examiner* — Thao T. Tran
(74) *Attorney, Agent, or Firm* — Kenyon & Kenyon LLP

(57) ABSTRACT

The present invention provides a surface-treated metal material having a film formed on at least a portion of a surface of a metal material, the film containing at least polyurethane resin and silicon oxide, and a metal surface treatment agent used to obtain the surface-treated metal material. The polyurethane resin contains one or more of siloxane bond, dehydration-condensation bond of silanol group and different functional group, and silanol moiety, and urea bond. The sum of the siloxane bond, the dehydration-condensation bond of silanol group and different functional group, total amount of the silanol moiety, and the silicon oxide falls within a range of equal to or more than 1.6 wt % to equal to or less than 25 wt % for solids of the film. The ratio of the total amount of urea bond and urethane bond to the total amount of resin components falls within a range of equal to or more than 0.1 wt % to equal to or less than 10 wt %.

20 Claims, No Drawings

SURFACE-TREATED METAL MATERIAL AND METAL SURFACE TREATMENT AGENT

TECHNICAL FIELD

The present invention relates to a surface-treated metal material and a metal surface treatment agent having superior corrosion resistance, overcoating paint adhesion, solvent resistance, alkali resistance, workability, and scratch resistance without containing hexavalent chrome which is noxious to environments.

The present application is based on Japanese Patent Application Nos. 2006-174578 and 2007-135983, the contents of which are incorporated herein by reference.

BACKGROUND ART

In many fields including electric home appliances, vehicles, construction materials, etc., it is common to subject a steel sheet or a surface-treated steel sheet to a chromate treatment in order to give it anti-rust or paint adhesion to an upper layer. However, since the chromate-treated steel sheet typically contains hexavalent chrome which is noxious to environments, need for hexavalent chrome-free surface-treated steel sheets has been recently increasing, and some related industries are trying to do away with steel sheets containing hexavalent chrome.

Under such circumstances, various methods for treating a surface of a steel sheet without using chromes have been proposed. For example, for a film containing an organic compound as a main component, Patent Document 1 discloses a method of treating the film with a treatment agent containing a phosphoric acid, an aluminum sol and a metal hydrosol, Patent Document 2 discloses a method of treating the film with water glass or sodium silicate and pyrazole, and Patent Document 3 discloses a method of coating the film with silicate. However, the organic film has a problem in that marks are likely to occur in machining and shaping the film and adhesion of the film to an overcoating paint is low, thereby limiting use of the film. In addition, for example, the chromate treatment does not yet provide sufficient corrosion resistance to sodium chloride.

In the related art, some studies on chromate films containing an organic compound as a main component, which may substitute the above-mentioned inorganic film, have been made. The chromate films containing an organic compound as a main component are promising as chrome-free films since they have excellent formability in addition to corrosion resistance. Among them, a film having high strength and containing a urethane resin, which has excellent adhesion, as main component is particularly promising as a chromate-free film.

At present, some techniques based on a urethane resin film have been proposed. For example, Patent Document 4 discloses a technique for preparing a film containing a composite material or a mixture of a urethane resin and silicon dioxide as a main component, as an example of a film having excellent film adhesion. Patent Document 5 discloses a technique for preparing a resin film containing colloidal silica or a silane coupling agent and certain metal phosphate in a urethane resin, as an example of a film having excellent electrodepositability and weldability, and Patent Document 6 discloses a technique using a treatment agent which is a mixture of a metal phosphate, an aqueous urethane resin and oxycarboxylic acid compound.

However, as a range of usage of the above-mentioned films is widened, requirements for the films become stricter. In the techniques disclosed in Patent Documents 4 to 6, adaptability of a structure of the urethane resin is not sufficiently considered, it may be difficult to secure strict performance such as alkali resistance, workability, corrosion resistance and the like, and solvent resistance may be deteriorated since it is difficult to obtain sufficient film formability.

In the mean time, as an example for techniques having an object of providing anti-rust property, Patent Document 7 discloses a technique for preparing a film formed by adding a silane coupling agent to a hydrophilic urethane resin, and Patent Document 8 discloses a technique for preparing an anti-rust coating agent formed by mixing an aqueous silica, a silane coupling agent, a thiocarbonyl group-contained compound and phosphoric ions with a mixture of an aqueous polyurethane resin and an aqueous polyolefin resin.

However, in the techniques disclosed in Patent Documents 7 and 8, like Patent Document 4, since adaptability of a structure of the resin is not sufficiently considered, it may be difficult to secure strict performance. In addition, in the techniques disclosed in Patent Documents 7 and 8, since the silane coupling agent is added to the resin, solution reactivity may become unstable, thereby making performance irregular depending on manufacture conditions. In addition, since it is difficult for these techniques to provide sufficient crosslinking reaction stably, these techniques have a problem of deterioration of solvent resistance required to clean out dusts and the like with solvent.

In addition, Patent Document 9 discloses a technique in which a silanol group is contained in a polyurethane resin. However, in this technique, although it makes it possible to form a lubricating film having good solution stability and high elasticity which endures continuous formation by a high surface pressure process, since the film and a resin structure are not designed in consideration of corrosion resistance, solvent resistance and other characteristics, the formed film may not show sufficient anti-rust performance.

[Patent Document 1] Japanese Patent Publication No. S53-47774
[Patent Document 2] Japanese Patent Publication No. S58-31390
[Patent Document 3] Japanese Unexamined Patent Application, First Publication No. H04-293789
[Patent Document 4] Japanese Patent Publication No. H06-7950
[Patent Document 5] Japanese Patent Publication No. H06-71579
[Patent Document 6] Japanese Unexamined Patent Application, First Publication No. 2001-181855
[Patent Document 7] Japanese Unexamined Patent Application, First Publication No. 2001-59184
[Patent Document 8] Japanese Unexamined Patent Application, First Publication No. 2001-164182
[Patent Document 9] Japanese Unexamined Patent Application, First Publication No. 2001-234119

DISCLOSURE OF THE INVENTION

Problems to be Solved by the Invention

It is therefore an object of the present invention to provide a surface-treated metal material and a metal surface treatment agent, which have superior corrosion resistance, overcoating paint adhesion, solvent resistance, alkali resistance, workability, scratch resistance and so on without containing hexavalent chrome which is noxious to environments, and can be endured in actual use environments, by finding out a film structure showing its optimal characteristics by paying attention to an urethane resin film as a surface-treated material which can substitute a chromate-treated material.

Means for Solving the Problems

The inventors have carefully studied effects of composition and additives of polyurethane resin on corrosion resistance, overcoating paint adhesion, solvent resistance, alkali resistance, workability, and scratch resistance of a metal material and have found that it is possible to obtain a surface-treated metal material having excellent corrosion resistance, overcoating paint adhesion, solvent resistance, alkali resistance, workability, and scratch resistance by first obtaining a surface treatment agent by mixing polyurethane resin and silicon oxide, the polyurethane resin containing bond due to a silanol group and having the content ratio of urea bond and urethane bond of equal to or more than 0.1 wt % and equal to or less than 10 wt %, and then coating the obtained surface treatment agent on a metal material through a stable and good crosslinking reaction in a printing and drying process, thereby obtaining a strong urethane resin film formed on the metal material.

Typically, in a case of aqueous polyurethane resin, it is common to form a thermoplastic film by emulsifying the polyurethane resin in water, coating the emulsion on a material of interest, and arranging and fusing the emulsion in a printing and drying process. However, it is difficult for the thermoplastic film alone to ensure high water resistance, alkali resistance, solvent resistance and anti-rust property. On this account, a method for improving such performance by adding a curing agent has been commonly used. However, the addition of the curing agent has an industrialization problem from a standpoint of printing temperature required for curing and stability of a treatment agent. The inventors have carefully reviewed this problem and have succeeded in contriving a metal surface treatment agent and a surface-treated metal material which can have all the above-mentioned performances at a relatively low printing temperature while securing stability of the surface treatment agent. That is, by containing a hydrophilic silanol group in polyurethane resin, it is possible to improve water-dispersibility (stability) of emulsion in water. Additionally, by bonding silanol groups contained in the polyurethane resin each other in the printing and drying process (that is, forming siloxane bond), it is possible to provide an intra-emulsion and/or inter-emulsion crosslinking structure. This may result in increase of crosslinking density of the resin, improvement of film formability, and improvement of performances of film, such as anti-rust (prevention of oxygen, water and the like from being introduced into the film), alkali resistance, solvent resistance and so on. In addition, it is possible to increase strength of adhesion of the film to an underlying metal material because of bond of the silanol group and the underlying metal material. Since such a crosslinking reaction of the silanol group can be obtained in a printing process at a temperature lower than that for a general curing agent reaction, it is particularly useful when a high temperature printing process is difficult to be carried out.

In addition, by properly adjusting the content of urea bond and urethane bond in the polyurethane resin, it is possible to obtain a film having good adhesion of the film to a metal material or an overcoating paint, and good balance between hardness and stretchability, thereby proving good compatibility between scratch resistance and workability. In addition, by adding the silicon oxide, it is possible to form siloxane bond of the silanol group in the polyurethane resin with the silicon oxide, thereby accelerating the crosslinking reaction and hence increasing the corrosion resistance and the adhesion. In addition, by adding the silicon oxide, it is possible to increase strength of the film itself, thereby improving the corrosion resistance of the film.

Such effects may be further increased when a cyclic compound or an aromatic compound is introduced in a skeleton of the resin. The cyclic compound or the aromatic compound has a stable chemical structure, it assists in increasing the strength of the polymer resin and improving the solvent resistance of the film. At the same time, since an electron distribution of the cyclic compound or the aromatic compound has orientation, this compound is likely to cause hydrogen bond with the metal material and the overcoating paint, thereby making the adhesion better. Thus, by putting the cyclic compound or the aromatic compound into the resin structure by a proper amount, it is possible to secure excellent scratch resistance, solvent resistance and overcoating paint adhesion.

In addition, by introducing a monomer having a branch structure into polyols constituting the polyurethane resin, it is possible to increase crosslinking reactivity in formation of the film to increase crosslinking density, thereby improving corrosion resistance, solvent resistance and alkali resistance.

In addition, by containing a carboxyl group or a sulfonic acid group in the resin skeleton structure by a proper amount and self-emulsifying the polyurethane resin using a neutralizing agent in water dispersion so that the polyurethane resin is dispersed in water, it is possible to improve film formability. That is, it is possible to improve film performance such as anti-rust (prevention of oxygen, water and the like from being introduced into the film), alkali resistance, solvent resistance and so on. In particular, when alkanol amine is used as the neutralizing agent, it is possible to improve the film formability. In addition, by using a neutralizing agent having a boiling point of equal to or less than 150° C. at which the neutralizing agent is likely to be volatilized, it is possible to reduce the neutralizing agent which may be left in the film after a printing and drying process, thereby further improving the film formability. Furthermore, by optimizing the content of the carboxyl group or the sulfonic acid group and the kind and amount of the neutralizing agent, it is also possible to improve stability of the surface treatment agent.

In addition, when polyolefin resin is properly added in the film, it is possible to improve corrosion resistance and workability. Since the polyolefin resin has relatively excellent corrosion factor barrier properties and flexibility, it is possible to obtain a film having excellent performance balance.

In addition, by adding a phosphatic compound in the film, it is possible to improve corrosion resistance. It is believed that the phosphatic compound contributes to the improvement of the corrosion resistance since the phosphatic compound can form a precipitated film by reacting with a surface of metal such as iron or zinc and can increase crosslinking density of the resin film. When a film contains the phosphatic compound consisting of one or more of phosphates of ammonia, sodium, calcium and magnesium, the polyurethane resin of a mixture of the polyurethane resin and the polyolefin resin, the silicon oxide by a predetermined amount, it is possible to provide best performance balance and good stability of the surface treatment agent.

In addition, when a crosslinking agent is introduced in the surface treatment to further raise a crosslinking reaction in addition to the crosslinking reaction by the silanol group, it is possible to form a film at a lower printing temperature and increase reaction velocity. When the crosslinking agent consists of one or more of a carbodiimide-containing compound, an oxazoline-containing compound and an organic titanate compound, the most remarkable effect can be obtained. In particular, when two or more of these compounds are used together, characteristics of respective compounds as the crosslinking agent become complex, which provides more advantageous properties of the film. For example, if the crosslinking agent is a polymer, it is possible to provide a characteristic of the polymer itself as well as an effect of crosslinking between resins. Specifically, a polymer of a skeleton of a crosslinking agent and an organic polymer bonded thereto may improve the adhesion of film to metal material or overcoating paint, solvent resistance and alkali resistance.

In addition, when a lubricant is properly added in the film, it is possible to decrease a surface friction coefficient, thereby obtaining a surface-treated metal material having excellent workability. The lubricant may include, for example, a water-soluble polyethylene resin, a tetrafluorethylene resin, a stearic acid compound, a natural paraffin wax, etc. Among them, the water-soluble polyethylene resin is preferable since it shows significant reduction of friction coefficient.

The surface-treated metal material can be obtained by coating the metal surface treatment agent on a metal material and printing and drying the coated metal surface treatment agent. In particular, a surface-treated metal material obtained by coating the metal surface treatment agent on a Zn-plated steel sheet at a predetermined film thickness shows a remarkable effect. In addition, the effect becomes most remarkable when the film formed on the surface-treated metal material has a predetermined composition range of the amount of bond due to the silanol group, the content of the silicon oxide, the content of the polyolefin resin and the content of the phosphatic compound.

In addition, when an elasticity modulus of the film coated on the metal material is equal to or more than 0.2 GPa and equal to or less than 20 GPa at 25° C., it is possible to obtain a film which endures increase of molding temperature due to continuous formation, thereby securing good workability of the film and providing lubrication for the film.

In conclusion, the main points of the present invention are as follows.

(1) A surface-treated metal material having a film formed on at least a portion of a surface of a metal material, the film containing at least polyurethane resin and silicon oxide, wherein the polyurethane resin contains one or more of siloxane bond, dehydration-condensation bond of silanol group and different functional group, and silanol moiety, and urea bond, wherein the sum of the siloxane bond, the dehydration-condensation bond of silanol group and different functional group, total amount of the silanol moiety, and the silicon oxide falls within a range for solids of the film as expressed by the following equation, $$1.6 \text{ wt }\% \leq ((Wa+Wb+Wc+Wd)/W) \times 100 \leq 25 \text{ wt }\%$$

where, W is total weight of solids of the film, Wa is weight of silicon forming the siloxane bond (—Si—O—Si—), Wb is weight of silicon forming the dehydration-condensation bond (—Si—O—R—; R is any element other than Si), Wc is weight of silicon forming the silanol moiety (—Si—OH), and Wd is weight of silicon forming silicon oxide, and wherein the ratio of the total amount of urea bond and the urethane bond to the total amount of resin components falls within a range as expressed by the following equation, $$0.1 \text{ wt }\% \leq ((Ta+Tb)/T) \times 100 \leq 10 \text{ wt }\%$$

where, T is weight of resin components in solids of the film, Ta is weight of nitrogen forming urea bond (—NH—CO—NH—), and Tb is weight of nitrogen forming urethane bond (—NH—CO—O—).

(2) The surface-treated metal material according to the item (1), wherein a skeleton of the polyurethane resin further contains at least one of a cyclic compound and an aromatic compound.

(3) The surface-treated metal material according to the item (2), wherein the cyclic compound contained in the skeleton of the polyurethane resin is a compound containing one or more of a cyclohexanol group, a cyclopentanol group, an isophorone group and a dicyclohexyl group, and wherein the aromatic compound contained in the skeleton of the polyurethane resin is a compound containing one or more of a bisphenol group, a crezole group and a diphenyl group.

(4) The surface-treated metal material according to any one of the items (1) to (3), wherein the film containing the polyurethane resin further contains a polyolefin resin of equal or more than 5 wt % and equal to or less than 40 wt %.

(5) The surface-treated metal material according to any one of the items (1) to (4), wherein the film containing the polyurethane resin further contains a phosphatic compound of equal to or more than 0.1 wt % and equal to or less than 10 wt % in terms of phosphorus.

(6) The surface-treated metal material according to any one of the items (1) to (5), wherein the film containing the polyurethane resin further contains one or more selected from a group consisting of a carbodiimide group-containing compound, an oxazoline group-containing compound and a titanium compound.

(7) The surface-treated metal material according to any one of the items (1) to (6), wherein the film containing the polyurethane resin has an elasticity modulus of equal to or more than 0.5 GPa and equal to or less than 20 GPa at 25° C.

(8) The surface-treated metal material according to any one of the items (1) to (7), further containing a lubricant of equal to or more than 1 wt % and equal to or less than 40 wt % in terms of solids of the film.

(9) A metal surface treatment agent containing polyurethane resin and silicon oxide, wherein the polyurethane resin contains one or more of siloxane bond, dehydration-condensation bond of silanol group and different functional group, and silanol moiety, and urea bond, wherein the sum of the siloxane bond, the dehydration-condensation bond of silanol group and different functional group, total amount of the silanol moiety, and the silicon oxide falls within a range for solids of the metal surface treatment agent as expressed by the following equation, $$1.6 \text{ wt }\% \leq ((Wa+Wb+Wc+Wd)/W) \times 100 \leq 25 \text{ wt }\%$$

where, W is total weight of solids of the film, Wa is weight of silicon forming the siloxane bond (—Si—O—Si—), Wb is weight of silicon forming the dehydration-condensation bond (—Si—O—R—; R is any element other than Si), Wc is weight of silicon forming the silanol moiety (—Si—OH), and Wd is weight of silicon forming silicon oxide, and wherein the ratio of the total amount of urea bond and urethane bond to the total amount of resin components falls within a range as expressed by the following equation, $$0.1 \text{ wt }\% \leq ((Ta+Tb)/T) \times 100 \leq 10 \text{ wt }\%$$

where, T is weight of resin components in solids of the film, Ta is weight of nitrogen forming urea bond (—NH—CO—NH—), and Tb is weight of nitrogen forming urethane bond (—NH—CO—O—).

(10) The metal surface treatment agent according to any the item (9), wherein a skeleton of the polyurethane resin further contains at least one of a cyclic compound and an aromatic compound.

(11) The metal surface treatment agent according to the item 10, wherein the cyclic compound contained in the skeleton of the polyurethane resin is a compound containing one or more of a cyclohexanol group, a cyclopentanol group, an isophorone group and a dicyclohexyl group; and the aromatic compound contained in the skeleton of the polyurethane resin is a compound containing one or more of a bisphenol group, a crezole group and a diphenyl group.

(12) The metal surface treatment agent according to any one of the items (9) to (11), wherein the polyurethane resin is water-dispersible or water-soluble and contains a carboxyl group or a sulfonic acid group.

(13) The metal surface treatment agent according to the item (12), wherein the polyurethane resin has an acid equivalent of 1000 to 3000.

(14) The metal surface treatment agent according to the item (12), wherein a neutralizing agent for water dispersion of the polyurethane resin is alkanol amine.

(15) The metal surface treatment agent according to the item (12), wherein a boiling point of a neutralizing agent for water dispersion of the polyurethane resin is equal to or less than 150° C.

(16) The metal surface treatment agent according to any one of the items (9) to (15), further containing a polyolefin resin of equal to or more than 5 wt % and equal to or less than 40 wt % for total amount of nonvolatile solids.

(17) The metal surface treatment agent according to any one of the items (9) to (16), further containing a phosphatic compound of equal to or more than 0.1 wt % and equal to or less than 10 wt % in terms of phosphorus for total amount of film solids.

(18) The metal surface treatment agent according to the item (17), wherein the phosphatic compound is phosphate of one or more selected from a group consisting of ammonia, sodium, calcium and magnesium.

(19) The metal surface treatment agent according to any one of the items (9) to (18), further containing, as a crosslinking agent of the polyurethane resin, one or more selected from a group consisting of a carbodiimide group-containing compound, an oxazoline group-containing compound and an organic titanate compound.

(20) The metal surface treatment agent according to any one of the items (9) to (19), further containing a lubricant of equal to or more than 1 wt % and equal to or less than 40 wt % for total amount of nonvolatile solids.

Effects of the Invention

The present invention can provide a surface-treated metal material which is free of hexavalent chrome noxious to environments and can substitute a chromate-treated material, and a metal surface treatment agent used to obtain the surface-treated metal material. Therefore, the surface-treated metal material and the metal surface treatment agent of the present invention are promising as environmental-friendly material and treatment agent in the future, and thus can make a significant contribution to various industrial fields.

BEST MODE FOR CARRYING OUT THE INVENTION

Hereinafter, the best mode for carrying out the present invention will be described in detail.

A surface-treated metal material of this invention can be obtained by applying a metal surface treatment agent to at least a portion of a surface of a metal material and printing and drying the applied metal surface treatment agent. A polyurethane resin used for the metal surface treatment agent is a polyurethane resin containing a silanol group. In this case, the composition ratio of urea group or urethane group to the total amount of resin components in the polyurethane resin is equal to or more than 0.1 wt % and equal to or less than 10 wt % in terms of nitrogen atoms. That is, the sum of siloxane bond, dehydration-condensation bond of silanol group and different functional group, total amount of silanol moiety, and silicon oxide falls within a range for solids of a film as expressed by the following equation.

$$1.6 \text{ wt \%} \leq ((Wa+Wb+Wc+Wd)/W) \times 100 \leq 25 \text{ wt \%}$$

Where, W is total weight of solids of the film, Wa is weight of silicon forming the siloxane bond (—Si—O—Si—), Wb is weight of silicon forming the dehydration-condensation bond (—Si—O—R—; R is any element other than Si), Wc is weight of silicon forming the silanol moiety (—Si—OH), and Wd is weight of silicon forming silicon oxide.

The polyurethane resin containing the silanol group may be formed by causing a hydrolytic silicon-contained compound having at least one activated hydrogen group in molecules to react with a polyurethane prepolymer, and dispersing or dissolving in water to hydrolyze the resultant. The polyurethane prepolymer may be obtained by causing a compound having at least two activated hydrogen groups per one molecule to react with a compound having at least two isocyanate groups per one molecule. Alternatively, the polyurethane prepolymer may be obtained by simultaneous reaction among a hydrolytic silicon-contained compound having at least one activated hydrogen group in molecules, a compound having at least two activated hydrogen groups per one molecule, and a compound having at least two isocyanate groups per one molecule. In this invention, the polyurethane resin has high molecule weight when it reacts with a chain extender by a predetermined amount. In this case, when the composition ratio of sum of urea group and urethane group of the urethane resin to the total amount of resin components is controlled to be more than 0.1 wt % and less than 10 wt % in terms of nitrogen atom, it is possible to obtain a film with excellent corrosion resistance, covercoating paint adhesion, solvent resistance, alkali resistance, workability and scratch resistance.

The hydrolytic silicon-contained compound having at least one activated hydrogen group in molecules refers to a compound in which a hydrolytic group to be hydrolyzed by water is bonded to a silicon atom. An example of the hydrolytic group may include a hydrogen atom, a halogen atom, an alkoxy group, an acyloxy group, an amino group, an amide group, an aminooxy group, a mercapto group, etc. Among these groups, the alkoxy group is preferable in that it is easily handled with relatively low hydrolysis. Although one to three hydrolytic groups are typically bonded to one silicon atom, it is preferable that two or three alkoxy group are bonded to one silicon atom from a viewpoint of reactivity, alkali resistance, solvent resistance and so on of a hydrolytic silyl group after application.

The hydrolytic silicon-contained compound having at least one activated hydrogen group in molecules may include, for example, γ-(2-aminoethyl)aminopropyltrimethoxysilane, γ-(2-aminoethyl)aminopropyltriethoxysilane, γ-(2-aminoethyl)aminopropyldimethoxysilane, γ-(2-aminoethyl)aminopropyldiethoxysilane, γ-aminopropyltrimethoxysilane, γ-aminopropyltrimethoxysilane, γ-aminopropyldimethoxysilane, γ-aminopropyldiethoxysilane, γ-mercaptopropyltrimethoxysilane, γ-mercaptopropylmethyldimethoxysilane, γ-mercaptopropyltriethoxysilane, γ-mercaptopropyldiethoxysilane, etc. It is preferable to introduce silanol groups between molecules constituting a polyurethane resin and employ a hydrolytic silicon-contained compound having two or more activated hydrogen groups to make effective contribution to film formation.

The content of silanol group is preferably equal to or more than 0.1 wt % and equal to or less than 5 wt % for total solids of the polyurethane resin in terms of silicon in order to provide excellent crosslinking reactivity and performance for the polyurethane resin. If the content of silanol group is less than 0.1 wt %, it is low in the effectiveness since it does not contribute to appropriate crosslinking reaction. If the content of silanol group exceeds 5 wt %, the effectiveness is saturated and stability of a surface treatment agent may be deteriorated. More preferably, the content of silanol group is equal to or more than 0.5 wt % and equal to or less than 3 wt %.

The compound having at least two activated hydrogen groups per one molecule may include, for example, compounds having an amino group, a hydroxyl group, a mercapto group, etc. as an activated hydrogen group. In consideration of speed of reaction with an isocyanate group and mechanical property after application, a compound having a hydroxyl group is preferable in that it is high in reaction speed. In addition, the number of functional groups of the compound having the activated hydrogen group is preferably 2 to 6, particularly preferably 2 to 4 in that it maintains good mechanical property of a film. In addition, molecule weight of the compound having the activated hydrogen group is preferably 200 to 10000, particularly preferably 300 to 5000 from a viewpoint of content of urethane bond given for final performance of the film and workability in manufacture.

The compound having the activated hydrogen group may include, for example, polycarbonate polyol, polyester polyol, polyether polyol, polyester amide polyol, acryl polyol, polyurethane polyol, or a mixture thereof.

The compound having at least two isocyanate groups per one molecule may include, for example, aliphatic isocyanate such as trimethylenediisocyanate, tetramethylenediisocyanate, hexamethylenediisocyanate, pentamethylenediisocyanate, 1,2-propylenediisocyanate, 1,2-butylenediisocyanate, 2,3-butylenediisocyanate, 1,3-butylenediisocyanate, 2,4,4-trimethylehexamethylenediisocyanate, 2,2,4-trimethylehexamethylenediisocyanate, 2,6-diisocyanate methylcaproate, and the like, cycloaliphatic diisocyanate such as 1,3-cyclopentanediisocyanate, 1,4-cyclohexanediisocyanate, 1,3-cyclohexanediisocyanate, 3-isocyanate methyl-3,5,5-trimethyl cyclohexylisocyanate, 4,4'-methylenebis(cyclohexyl isocyanate), methyl-2,4-cyclohexanediisocyanate, methyl-2,6-cyclohexanediisocyanate, 1,2-bis(isocyanatomethyl)cyclohexane, 1,4-bis(isocyanatomethyl)cyclohexane, 1,3-bis(isocyanatomethyl)cyclohexane, an the like, aromatic diisocyanate such as m-xylene diisocyanate, m-phenylene diisocyanate, p-phenylene diisocyanate, 4,4'-diphenyl diisocyanate, 1,5-naphthalene diisocyanate, 4,4'-diphenylmethane diisocyanate, 4,4'-tolylene diisocyanate, 4,4'-tolylene diisocyanate, 2,6'-tolylene diisocyanate, 4,4'-toluidine diisocyanate, dianisidine diisocyanate, 4,4'-diphenylether diisocyanate, and the like, araliphatic diisocyanate such as ω,ω'-diisocyanate-1,3-dimethyl benzene, ω,ω'-diisocyanate-1,4-dimethyl benzene, ω,ω'-diisocyanate-1,4-diethyl benzene, and the like, triisocyanate such as triphenylmethane-4,4'-4"-triisocyanate, 1,3,5-triisocyanatebenzene, 2,4,6-triisocyanatetoluene, and the like, polyisocyanate monomer including tetraisocyanate such as 4,4'-diphenyldimethylmethane-2,2',5,5'-tetraisocyanate and the like, dimmer, trimer, biuret, allophanate, carbodiimide, which are derived from the polyisocyanate monomer, adducts to the polyisocyanate monomer of polyols having low molecule weight of less than 200, such as ethyleneglycol, propyleneglycol, butyleneglycol and the like, adducts to the polyisocyanate monomer of polyester polyols, polyether polyols, polycarbonate polyols, polyester amide polyols, acryl polyols, polyurethane polyols, and so on.

The chain extender may include, for example, a known polyamine compound and so on. The polyamine compound may include, for example, diamines such as ethylene diamine, 1,2-propane diamine, 1,6-hexamethylenediamine, piperazine, 2,5-dimethyl piperazine, isophorone diamine, 4,4'-dicyclohexyl diamine, 3,3'-dimethyl-4,4'-dicyclohexyl methane diamine, 1,4-cyclohexane diamine, and the like, polyamines such as diethylene triamine, dipropylenetriamine, triethylenetetramine, tetraethylenepentamine, and the like, compounds having an amino group and a hydroxyl group such as hydroxyethyl hydrazine, hydroxyethyl diethyl triamine, 2-[(2-aminoethyl)amino]ethanol, 3-aminopropanediol, and the like, mixtures thereof, and so on.

When the predetermined amount of any of the above-mentioned chain extenders is mixed with the polyurethane prepolymer, along with the hydrolytic silicon-contained compound having at least one activated hydrogen group in molecules, the composition ratio of sum of urea group and urethane group of the urethane resin to the total amount of resin components may be controlled to be equal to or more than 0.1 wt % and equal to or less than 10 wt % in terms of nitrogen atom. In addition, it is preferable that the chain extender is mixed at a ratio of equal to or more than 0.1 wt % and equal to or less than 10 wt % in terms of nitrogen atom for the total amount of the polyurethane prepolymer. If the ratio is less than 0.1 wt %, it is not possible to obtain a desired amount of urea, which may result in deterioration of solvent resistance, adhesion to an underlying metal material or an overcoating paint, corrosion resistance, and scratch resistance. If the ratio exceeds 10 wt %, the film becomes too hard, which may result in deterioration of workability.

In addition, when a cyclic compound, that is, a compound having an aliphatic ring or an aromatic ring, is contained in the polyurethane resin, it is possible to increase the strength or solvent resistance of the film. Such a cyclic compound may be bonded, as either a substituent group or a side chain, to a main chain of a urethane resin. In addition, the compound having the aliphatic ring may include, for example, a cyclohexanol group-containing compound, a cyclopentanol group-containing compound, an isophorone group-containing compound, a dicyclohexyl group-containing compound, etc. The compound having the aromatic ring may include, for example, a bisphenol group-containing compound, a cresol group-containing compound, a diphenyl group-containing compound, etc. It is preferable that the content ratio of the compound having the aliphatic ring or the aromatic ring is equal to or more than 0.1 wt % and equal to or less than 30 wt % for total solids of the polyurethane resin. If the content ratio is less than 0.1 wt %, it is low in the effectiveness. If the content ratio exceeds 30 wt %, formability of the film may be deteriorated, which may result in deterioration of workability and adhesion of the film.

In addition, when a monomer having a branch structure is contained in polyol molecules constituting the polyurethane resin, it is possible to increase crosslinking reactivity in formation of the film to increase crosslinking density, thereby improving corrosion resistance, solvent resistance and alkali resistance. The monomer having the branch structure may include, for example, trimethylolpropane, pentaerythritol, castor oil, etc. The content ratio of the monomer is preferably equal to or more than 0.1 wt % and equal to or less than 30 wt % for total solids of the polyurethane resin. If the content ratio is less than 0.1 wt %, it is low in the effectiveness. If the content ratio exceeds 30 wt %, hardness of the film may become too high, which may result in deterioration of workability and adhesion of the film.

In addition, a hydrophilic group is introduced into the polyurethane prepolymer in order to disperse the polyurethane resin in water. For example, the hydrophilic group may be introduced by copolymerizing at least one kind of compounds having at least one activated hydrogen group in molecules and containing hydrophilic groups such as a carboxyl group, a sulfonic acid group, a sulfonate group, an epoxy group, a polyoxy ethylene group, and the like when the polyurethane prepolymer is manufactured. The carboxyl group or the sulfonic acid group as the hydrophilic group shows excellent water dispersibility and stability of emulsion in a treatment agent. In addition, the content of the carboxyl group or the sulfonic acid group is preferably 1000 to 3000 in terms of acid equivalent. If the content is less than 1000, the stability of emulsion is not sufficient, which may result in deterioration of stability of a treatment agent. If the content is more than 3000, alkali resistance and solvent resistance may be deteriorated. The hydrophilic group-containing compounds may include, for example, carboxyl group-containing compounds such as a 2,2-dimethylolpropionic acid, a 2,2-dimethylolbutyric acid, a 2,2-dimethylolvaleric acid, a dioxymaleic acid, a 2,6-dioxybenzoic acid, 3,4-diaminobenzoic acid, and the like, derivatives thereof, carboxyl group-containing compounds obtained by reaction of a compound having an anhydride group, such as polyester polyol, maleic anhydride, phthalic anhydride, succinic anhydride, trimellitic anhydride, pyromellitic anhydride, and the like, with a compound having an activated nitrogen group, derivatives thereof, sulfonic acid-containing compounds such as a 2-oxyethane sulfonic acid, a phenol sulfonic acid, a sulfobenzoic acid, a sulfosuccinic acid, a 5-sulfoisophthalic acid, a sulfanilic acid, and the like, derivatives thereof, nonion group-containing compounds such as a polyethylene-polyalkylene copolymer which contains at least equal to or more than 3 wt % in the repetition unit of polyester polyol and ethyleneoxide, which are obtained by copolymerizing the sulfonic acid-containing compounds, and at least one activated hydrogen group in polymer and which has molecule weight of 300 to 10000, polyether ester polyols obtained by copolymerizing the nonion group-containing compounds, and so on. In copolymerization, the hydrophilic group-containing compounds are used alone or in combination of two kinds.

A neutralizing agent is used to sufficiently dissolve or disperse the polyurethane resin in water. The neutralizing agent used for neutralization may include, for example, ammonium, tertiary amine such as triethylamine, triethanol amine, triisopropanolamine, trimethylamine, dimethylethanolamine, and the like, alkali metal such as sodium hydroxide, potassium hydroxide, calcium hydroxide, and the like, basic material such as hydroxide of alkaline earth metal, and so on. From a viewpoint of stability of a surface treatment agent, it is preferable to use alkanolamine such as the triethanol amine or the dimethylethanolamine. In addition, the boiling point of the neutralizing agent is preferably equal to or less than 150° C. If the boiling point exceeds 150° C., the neutralizing agent is much left on the film after it is printed and dried, which may result in deterioration of formability and of the film and hence deterioration of corrosion resistance, alkali resistance and solvent resistance of the film. The neutralizing agent may be used alone or in combination of two more kinds. The neutralizing agent may be added to the polyurethane prepolymer directly or may be added to water when it is dissolved or dispersed in water. The addition amount of the neutralizing agent is preferably 0.1 to 2.0 equivalent, more preferably 0.3 to 1.3 for the hydrophilic group such as the carboxyl group.

In addition, a surfactant may be used to make water solubility and dispersibility of the polyurethane prepolymer containing the hydrophilic group such as the carboxyl group better. The surfactant used may include, for example, nonion surfactants such as polyoxyethylenenonylphenylether, polyoxyethylene-oxypropylene block copolymer, and the like, anion surfactant such as sodium rauryl sulfate, sodium docecylbenzene sulfate, and so on. However, from a viewpoint of corrosion resistance, alkali resistance, solvent resistance and so on, a soap-free type that does not contain a surfactant is preferable.

When a carboxyl acid or a sulfonic acid is contained in the polyurethane resin, acid equivalent is 1000 to 3000, and alkanol amine having the boiling point of equal to or less than 150° C. is selected as a neutralizing agent for water dispersion, water dispersion is possible without using a surfactant, which results in best formability of the film after it is printed and dried, particularly best corrosion resistance, alkali resistance and solvent resistance.

In addition, an organic solvent may be used when the polyurethane prepolymer is synthesized. In this case, it is preferable to use an organic solvent having relatively high solubility to water. The organic solvent used may include, for example, acetone, ethylmethylketone, acetonitrile, N-methylpyrrolidone, etc.

In addition, a curing catalyst may be added to accelerate siloxane bond of the silanol group of the polyurethane resin of the present invention. In the polyurethane resin of the present invention, when the polyurethane resin is coated with strong alkaline tertiary amine, the strong alkaline tertiary amine acts as a catalyst to form siloxane bond singularly without deteriorating water resistance and solvent resistance, thereby making it possible to introduce a crosslinking structure efficiently. In this case, pKa of the strong alkaline tertiary amine is more than 11. The strong alkaline tertiary amine may include, for example, 1,8-diazabicyclo[5.4.0]undecene-7 (DBU), 1,6-diazabicyclo[3.4.0]nonene-5. The strong alkaline tertiary amine may be added as the curing catalyst when the polyurethane prepolymer is synthesized, after the polyurethane prepolymer is synthesized, or after the polyurethane prepolymer is dispersed or dissolved in water.

In addition, a film forming assistant may be added to the polyurethane emulsion of the present invention in order to improve film formability, if necessary. The film forming assistant may include, for example, alcohols such as methanol, ethanol, n-propanol, isopropanol, n-butanol, isobutanol, hexanol, octanol, 2,2,4-trimethyl-1,3-pentandiolmonoisobutylate, and the like, ethers such as cellosolve, ethylcellosolve, butylcellosolve, diethyleneglycolmonoethylether, ethyleneglycoldimethylether, diethyleneglycolmonobutylether, propyleneglycolmonoethylether, propyleneglycohnonobutylether, dipropyleneglycolmonoisobutylether, tripropyleneglycolmonoethylether, tripropyleneglycolmonoisobutylether, and the like, glycoletheresters such as butylcellosolve acetate, diethyleneglycolmonobutylether acetate, dipropyleneglycolmonobutylether acetate, tripropyleneglycolmonoisobutylether acetate, and the like, etc. The film forming assistant may be used alone or in combination of two or more kinds as necessary.

In addition, in the film of the present invention, resins other than the polyurethane resin may be mixed. In this case, the resins other than the polyurethane resin may be mixed in moderation if the sum of siloxane bond, dehydration-condensation bond of silanol group and different functional group, total amount of bond due to silanol group including silanol moiety, and silicon oxide satisfies the condition of more than 1.6 wt % and 25 wt % in terms of silicon for solid of the film, and the ratio of the total amount of urea bond and urethane bond to the total amount of resin components satisfies the condition of equal to or more than 0.1 wt % and equal to or less than 10 wt % in terms of nitrogen atomic weight. That is, the resins other than the polyurethane resin may be mixed in moderation if the sum of siloxane bond, dehydration-condensation bond of silanol group and different functional group, total amount of silanol moiety, and silicon oxide falls within a range for solids of the film as expressed by the following equation, $$1.6 \text{ wt \%} \leq ((Wa+Wb+Wc+Wd)/W) \times 100 \leq 25 \text{ wt \%}$$

where W is total weight of solids of the film, Wa is weight of silicon forming the siloxane bond (—Si—O—Si—), Wb is weight of silicon forming the dehydration-condensation bond (—Si—O—R—; R is any element other than Si), Wc is weight of silicon forming the silanol moiety (—Si—OH), and Wd is weight of silicon forming silicon oxide, and if the ratio of the total amount of urea bond and urethane bond to the total amount of resin components falls within a range as expressed by the following equation, $$0.1 \text{ wt \%} \leq ((Ta+Tb)/T) \times 100 \leq 10 \text{ wt \%}$$

where, T is weight of resin components in solids of the film, Ta is weight of nitrogen forming urea bond (—NH—CO—NH—), and Tb is weight of nitrogen forming urethane bond (—NH—CO—O—).

Here, the "total amount of resin components" means the total amount of polyurethane resin if only the polyurethane resin is contained in the film and means the sum of the amount of polyurethane resin and the amount of resins other than the polyurethane resin if the resins other than the polyurethane resin are also contained in the film. In addition, the resins other than the polyurethane resin may include, for example, an epoxy resin, an acryl resin, a polyolefin resin, a polyester resin, a polyether resin, etc. Among these resins, the polyolefin resin is preferable as a resin to be mixed. When the polyurethane resin having high strength and excellent adhesion and the polyolefin resin having excellent corrosion factor barrier property and flexibility are contained in the film, the film has the combined effect of improved corrosion resistance and workability of the film in addition to increased strength and adhesion of the film. The content ratio of the polyolefin resin is preferably equal to or more than 5 wt % and equal to or less than 40 wt %. If the content ratio is less than 5 wt %, the combined effect is insufficient. If the content ratio exceeds 40 wt %, characteristics of the polyurethane resin may not be sufficiently shown.

Next, silicon oxide will be described. The silicon oxide may include, for example, silicon dioxide, etc. The silicon oxide is advantageously a compound which can be stably dispersed and not precipitated in water. Particularly, colloidal silica is preferably used as the silicon oxide since the colloidal silica shows remarkable solvent resistance and corrosion resistance. For example, colloidal silica particles such as "SNOTEX O", "SNOTEX OS", "SNOTEX OXS", "SNOTEX N", "SNOTEX NS", and "SNOTEX NXS" (available from NISSAN CHEMICAL INDUSTRIES, LTD.), fiber-like colloidal silica such as "SNOTEX UP" and "SNOTEX PS" (available from NISSAN CHEMICAL INDUSTRIES, LTD.), etc. may be used as the silicon oxide depending on pH of a surface treatment agent.

The content ratio of silicon oxide is preferably equal to or less than 1.5 wt % and equal to or less than 20 wt % in terms of silicon for solids of the film. If the content ratio is less than 1.5 wt %, an effect of the silicon oxide is insufficient. If the content ratio exceeds 20 wt %, the effect of the silicon oxide is saturated to be uneconomical, and workability and corrosion resistance may be deteriorated. For a surface-treated metal material, the sum of the amount of silicon oxide and the amount of bond due to silanol group of equal to or more than 1.6 wt % and equal to or less than 25 wt % for the total amount of solids of the film is preferable as the content ratio of silicon in the film.

Next, a phosphate compound will be described. The phosphate compound may include, for example, phosphate 3 ammonium, phosphate hydrogen 2 ammonium, phosphate 2 hydrogen ammonium, phosphate potassium, phosphate 2 hydrogen potassium, phosphate sodium, phosphate hydrogen 2 sodium, phosphate 2 hydrogen sodium, phosphate 2 hydrogen calcium, phosphate hydrogen magnesium, phosphate 2 hydrogen magnesium, etc. Among them, at least one of a phosphate ammonium compound such as phosphate 3 ammonium, phosphate hydrogen 2 ammonium, phosphate 2 hydrogen ammonium, or the like, a phosphate sodium compound such as phosphate sodium, phosphate hydrogen 2 sodium, phosphate 2 hydrogen sodium, or the like, a phosphate calcium compound such as phosphate 2 hydrogen calcium or the like, a phosphate magnesium compound such as phosphate hydrogen magnesium, phosphate 2 hydrogen magnesium, or the like is preferably used since they show remarkable solvent resistance and corrosion resistance. As long as these compounds are water-soluble or acid or alkali-soluble, they may be used depending on pH of a surface treatment agent, and may be used in the form of either pure compound or hydrate.

The content ratio of phosphate compound is preferably more than 0.1 wt % and less than 10 wt % in terms of phosphorus for solids of the film. If the content ratio is less than 0.1 wt %, the effect of the phosphate compound is insufficient. If the content ratio exceeds 10 wt %, hydration of the film increases, which may result in deterioration of corrosion resistance of the film.

In addition, it may be considered that a crosslinking agent and an additive are used to perform efficient crosslinking reaction at a lower printing temperature and provide a characteristic of the crosslinking agent for the film. The crosslinking agent is not particularly limited if only it is water-soluble or water-dispersible. It is preferable to use, one or more of a carbodiimide group-containing compound, an oxazoline group-containing compound and an organic titanate compound as the crosslinking agent.

The carbodiimide group-containing compound may include, for example, an aromatic carbodiimide compound, an aliphatic carbodiimide compound, etc., and forms a crosslinking structure mainly with an activated hydrogen group such as carboxyl group, a hydroxyl group or the like. For example, Carbodilite V-02, Carbodilite V-02-L2, Carbodilite E-01, Carbodilite E-02, Carbodilite E-03 A and Carbodilite E-04 (available from NISSHINBO INDUSTRIES, INC.) may be used as the carbodiimide group-containing compound.

The oxazoline group-containing compound may include, for example, Epocros K-2010E, Epocros K-2020E, Epocros K-2030E, Epocros WS-500, Epocros WS-700, etc. (available from NIPPON SHOKUBAI CO., LTD.). The oxazoline group-containing compound forms a crosslinking structure mainly by reacting with a carboxyl group.

The organic titanate compound may include, for example, Orgatics TC-300 (dihydroxbis(ammoniumlactate)titanium; available from Matsumoto Fine Chemical Co., Ltd.), Orgatics TC-400 (diisoproxytitanbis(triethanolaminate); available from Matsumoto Fine Chemical Co., Ltd.), etc. The titanium compound forms a crosslinking structure mainly with an activated hydrogen group such as carboxyl group, a hydroxyl group or the like.

Although being varied depending acid equivalent of resin, the addition amount of crosslinking agent is preferably equal to or more than 5 wt % and equal to or less than 50 wt % at a ratio of solids of crosslinking agent to main resin (the polyurethane resin in the present invention) from balance of material properties such as curability, stretchability, hardness and so on of the film.

Additionally, when a lubricant is properly added, it is possible to obtain products having a low friction coefficient while maintaining good performance, thereby obtaining a surface-treated metal material with excellent workability and scratch resistance. The lubricant may typically include, for example, a water-soluble polyethylene resin, a polytetrafluorethylene resin, a stearic acid compound, a natural paraffin wax, etc. Among them, the water-soluble polyethylene resin and the polytetrafluorethylene resin are preferable since they show significant reduction of friction coefficient. The lubricant is added in such a manner that it is contained within the film or exists on a surface of the film. The lubricant exists on the surface of the film when the lubricant originally contained in the film rises up as well as when the lubricant is applied on the film after the film is formed.

The content ratio of lubricant is preferably equal to or more than 1 wt % and equal to or less than 40 wt % in terms of solids of the treated film. If the content ratio is less than 1 wt %, the effect of the lubricant is insufficient. If the content ratio exceeds 40 wt %, the effect of reduction of friction coefficient is saturated, and film formability is deteriorated, which results in deterioration of corrosion resistance.

A metal material used in the present invention is not particularly limited, and may include, for example, an Al killed steel sheet, an extra low-carbon steel sheet added with Ti, Nb and the like, a high strength steel sheet obtained by adding reinforcing elements such as P, Si, Mn and the like to the Al killed steel sheet or the extra low-carbon steel sheet, a material obtained by subjecting the high strength steel sheet to various plating treatments, a Cr-containing steel sheet of which a stainless steel sheet is representative. In addition, the metal material may include metal materials which do not contain Fe, such as Al metal, Al alloy, Ti metal, Ti alloy, Mg alloy, and the like. Among them, some may be used for scratch resistance and decorative coating although not being required for coating for rust resistance. Among them, the metal material used in the present invention is particularly preferably a Zn-plated steel sheet.

A coating layer of the metal material is not particularly limited. Plating the metal material with particularly Zn or Zn alloys such as Zn—Ni, Zn—Fe, Zn—Mg, Zn—Al, Zn—Cr, Zn—Ti, Zn—Mn, Zn—Al—Mg, Zn—Al—Si, Zn—Al—Mg—Si shows best characteristics, and it is possible to replace a chromate film with the resultant film. In addition, the coating layer may include, for example, an AL layer, a layer of an alloy of Al and at least one of Si, Zn and Mg, for example, a layer of an Al-base allay such as an Al—Si alloy, an Al—Zn alloy, an Al—Si—Mg alloy or the like, an alloy of a Sn—Zn alloy, etc.

The metal material may be steel sheets of different shapes, for example, a pipe-shaped steel sheet, a pile-shaped steel sheet or H-steel, a line-shaped bar steel or wire rod, instead of the plate-shaped steel sheet.

Typically the thickness of the film of the present invention is preferably equal to or more than 0.1 μm and equal to or less than 5 μm. If the thickness is less than 0.1 μm, it makes little contribution to corrosion resistance. If the thickness exceeds 5 μm, the effect by the thickness is saturated to be uneconomical.

As described above, in the formed film, the sum of siloxane bond, dehydration-condensation bond of silanol group and different functional group, total amount of silanol moiety, and silicon oxide is equal to or more than 1.6 wt % and equal to or less than 25 wt % in terms of silicon. It is possible to quantitatively analyze these components of the film using existing methods such as mass spectrometry, fluorescent X-rays analysis, nuclear magnetic resonance spectrometry, infrared spectroscopy, X-ray electron spectroscopy, X-ray microanalyzer, and the like, a combination thereof, etc. Here, "different functional group" generally includes, for example, functional groups such as a hydroxyl group, an amino group, an isocyanate group, an imide group, an oxazoline group, an epoxy group, an alkoxyl group, and the like, which form dehydration-condensation bond or crosslinking bond by reacting with the silanol group.

When the metal material has the plate shape, it is mainly subject to a press molding process, and accordingly, it preferably has a large film elasticity modulus. In the present invention, the elasticity modulus of the polyurethane resin film formed on the metal material is preferably equal to or more than 0.5 GPa and equal to or less than 20 GPa at the temperature of 25° C. In this case, the elasticity modulus represents a dynamic storage elasticity modulus (E') obtained from indentation depth of the resin film using a micro hardness tester. If the dynamic storage elasticity modulus is less than 0.5 GPa, the hardness of the film is insufficient, and accordingly, the film is likely to be peeled off or scratched due to a strong processing such as a caulking process. If the dynamic storage elasticity modulus exceeds 20 GPa, the film becomes too hard, thereby lowering stretchability of the film, which results in deterioration of workability and corrosion resistance of the film.

The surface treatment agent may be coated on the metal material using known methods such as spray coating, roll coat, bar coat, digestion, electrostatic coating and the like. The printing dry may be performed by known methods using a hot air drying furnace, an induction heating furnace, a near infrared ray oven, a direct fired furnace, an the like, a combination thereof, and so on. The surface treatment agent may be cured by an energy ray such as an ultraviolet ray or an electron ray depending on the kind of resin used. Heating temperature of a reaching plate is preferably 100° C. to 250° C. If the heating temperature is less than 100° C., it takes for a long time to dry the surface treatment agent to sufficiently crosslink the surface treatment agent, which is unpractical. If the heating temperature exceeds 250° C., the organic resin is thermally decomposed, which has an adverse effect on corrosion resistance. The heating temperature of the reaching plate is more preferably 100° C. to 250° C. from an industrial point of view. The heated and dried surface treatment agent may be cooled by known methods such as water cooling, air cooling and the like, a combination thereof, and so on.

In the present invention, before forming the polyurethane resin film, by adding a chemically-treated film such as a phosphate-treated film or the like to the metal material or by treating the same film to have two or more layers, it is possible to further improve corrosion resistance or provide further performance, if necessary. In addition, before the chemical treatment, a post-plating treatment such as a zero-spangle treatment, which is an treatment for making an external appearance uniform after fusion plating, an annealing treatment, which is a treatment for modifying a plated layer, a temper rolling treatment for adjustment of surface condition or quality of material, or the like, may be carried out without being limited thereto.

EXAMPLES

Manufacture examples and examples of the present invention will be hereinafter described in detail, but not intended to limit the scope of the present invention.

Manufacture Example 1

Polyurethane Resin A 1,3-bis(isocyanate methyl)cyclohexane of 145.37 g, dimethyloipropionic acid of 20.08 g, neopentyl glycol of 15.62 g, polycarbonatediol (molecular weight: 1000) of 74.93 g, and acetonitrile of 64.00 g as a solvent are mixed and agitated in a 4-opening flask equipped with an agitator, a Dimroth condenser, a nitrogen introduction tube, a silica gel drying tube, and a thermometer at temperature of 75° C. for 3 hours under a nitrogen atmosphere. In this case, the sum of contents of urea group and urethane group becomes 3.3 wt % in terms of nitrogen atoms. Next, after confirming a predetermined amine equivalent and decreasing temperature of this mixed solution to 40° C., triethylamine (boiling point: 89° C.) of 15.16 g and 1,8-diazabicyclo[5.4.0]undecene-7 (DBU) (as a curing catalyst) of 0.25 g are added to the mixed solution to obtain an acetonitrile solution of polyurethane prepolymer. The polyurethane prepolymer of 327.82 g is emulsified by a chain extension reaction caused by dispersing the polyurethane prepolymer in an aqueous solution, which is obtained by dissolving KBM-602 (available from Shin-Etsu Chemical Co., Ltd.) of 23.55 g and hydrazine 1 hydrate of 11.43 g in water of 700.00 g, using a homodisper. Then, the acetonitrile used to synthesize the polyurethane prepolymer is distilled and eliminated at temperature of 50° C. under a reduced pressure of 150 mmHg to obtain polyurethane resin emulsion A which does not substantially contain the solvent and has solids content of 30 wt %, viscosity of 30 mPa·s (25° C.) and acid equivalent of 2000. Elasticity modulus of a single film of the resin at 25° C. is 3.5 GPa. In the following manufacture examples 1 to 5, the elasticity modulus is measured at a measurement temperature of 25° C. using an ultra micro hardness tester "Fischer Scope H-100" (available from Fischer Instruments, Co., Ltd.).

Manufacture Example 2

Polyurethane Resin B 1,3-bis(isocyanate methyl)cyclohexane of 143.57 g, dimethylolpropionic acid of 21.56 g, neopentyl glycol of 3.35 g, $PO_2$ mol additive of bisphenol A of 55.34 g, polycarbonatediol (molecular weight: 1000) of 32.18 g, and acetonitrile of 64.00 g as a solvent are mixed and agitated in a 4-opening flask equipped with an agitator, a Dimroth condenser, a nitrogen introduction tube, a silica gel drying tube, and a thermometer at temperature of 75° C. for 3 hours under a nitrogen atmosphere. In this case, the sum of contents of urea group and urethane group becomes 4.5 wt % in terms of nitrogen atoms. Next, after confirming a predetermined amine equivalent and decreasing temperature of this mixed solution to 40° C., triethylamine (boiling point: 89° C.) of 16.25 g and 1,8-diazabicyclo[5.4.0]undecene-7 (DBU) (as a curing catalyst) of 0.25 g are added to the mixed solution to obtain an acetonitrile solution of polyurethane prepolymer. The polyurethane prepolymer of 331.77 g is emulsified by a chain extension reaction caused by dispersing the polyurethane prepolymer in an aqueous solution, which is obtained by dissolving KBM-602 (available from Shin-Etsu Chemical Co., Ltd.) of 21.33 g and hydrazine 1 hydrate of 10.34 g in water of 700.00 g, using a homodisper. Then, the acetonitrile used to synthesize the polyurethane prepolymer is distilled and eliminated at temperature of 50° C. under a reduced pressure of 150 mmHg to obtain polyurethane resin emulsion B which does not substantially contain the solvent and has solids content of 30 wt %, viscosity of 30 mPa·s (25° C.) and acid equivalent of 1900. Elasticity modulus of a single film of the resin at 25° C. is 4.8 GPa.

Manufacture Example 3

Polyurethane Resin C 1,3-bis(isocyanate methyl)cyclohexane of 139.35 g, dimethylolpropionic acid of 21.39 g, neopentyl glycol of 8.32 g, trimethylolpropane of 7.14 g, polycarbonatediol (molecular weight: 1000) of 79.81 g, and acetonitrile of 64.00 g as a solvent are mixed and agitated in a 4-opening flask equipped with an agitator, a Dimroth condenser, a nitrogen introduction tube, a silica gel drying tube, and a thermometer at temperature of 75° C. for 3 hours under a nitrogen atmosphere. In this case, the sum of contents of urea group and urethane group becomes 2.3 wt % in terms of nitrogen atoms. Next, after confirming a predetermined amine equivalent and decreasing temperature of this mixed solution to 40° C., triethylamine (boiling point: 89° C.) of 16.12 g and 1,8-diazabicyclo[5.4.0]undecene-7 (DBU) (as a curing catalyst) of 0.25 g are added to the mixed solution to obtain an acetonitrile solution of polyurethane prepolymer. The polyurethane prepolymer of 314.58 g is emulsified by a chain extension reaction caused by dispersing the polyurethane prepolymer in an aqueous solution, which is obtained by dissolving KBM-602 (available from Shin-Etsu Chemical Co., Ltd.) of 20.77 g and hydrazine 1 hydrate of 10.08 g in water of 700.00 g, using a homodisper. Then, the acetonitrile used to synthesize the polyurethane prepolymer is distilled and eliminated at temperature of 50° C. under a reduced pressure of 150 mmHg to obtain polyurethane resin emulsion C which does not substantially contain the solvent and has solids content of 30 wt %, viscosity of 30 mPa·s (25° C.) and acid equivalent of 1900. Elasticity modulus of a single film of the resin at 25° C. is 3.3 GPa.

Manufacture Example 4

Polyurethane Resin D 1,3-bis(isocyanate methyl)cyclohexane of 145.37 g, dimethylolpropionic acid of 20.08 g, neopentyl glycol of 15.62 g, polycarbonatediol (molecular weight: 1000) of 74.93 g, and acetonitrile of 64.00 g as a solvent are mixed and agitated in a 4-opening flask equipped with an agitator, a Dimroth condenser, a nitrogen introduction tube, a silica gel drying tube, and a thermometer at temperature of 75° C. for 3 hours under a nitrogen atmosphere. In this case, the sum of contents of urea group and urethane group becomes 6.8 wt % in terms of nitrogen atoms. Next, after confirming a predetermined amine equivalent and decreasing temperature of this mixed solution to 40° C., dimethylethanolamine (boiling point: 135° C.) of 13.37 g and 1,8-diazabicyclo[5.4.0]undecene-7 (DBU) (as a curing catalyst) of 0.25 g are added to the mixed solution to obtain an acetonitrile solution of polyurethane prepolymer. The polyurethane prepolymer of 327.98 g is emulsified by a chain extension reaction caused by dispersing the polyurethane prepolymer in an aqueous solution, which is obtained by dissolving KBM-602 (available from Shin-Etsu Chemical Co., Ltd.) of 23.69 g and hydrazine 1 hydrate of 11.49 g in water of 700.00 g, using a homodisper. Then, the acetonitrile used to synthesize the polyurethane prepolymer is distilled and eliminated at temperature of 50° C. under a reduced pressure of 150 mmHg to obtain polyurethane resin emulsion D which does not substantially contain the solvent and has solids content of 30 wt %, viscosity of 30 mPa·s (25° C.) and acid equivalent of 2000. Elasticity modulus of a single film of the resin at 25° C. is 5.5 GPa.

Manufacture Example 5

Polyurethane Resin E 4,4'-methylenebis(cyclohexylisocyanate) of 155.87 g, dimethylolpropionic acid of 27.36 g, neopentyl glycol of 1.93 g, 1,6-hexanediol of 4.39 g, polyesterpolyol (molecular weight: 1000) of 111.38 g, which is composed of an adipic acid, neopentyl glycol, and 1,6-hexanediol, and N-methylpyrrolidone of 130 g as a solvent are mixed and agitated in a 4-opening flask equipped with an agitator, a Dimroth condenser, a nitrogen introduction tube, a silica gel drying tube, and a thermometer at temperature of 80° C. for 4 hours under a nitrogen atmosphere. In this case, the sum of contents of urea group and urethane group becomes 15 wt % in terms of nitrogen atoms. Next, after confirming a predetermined amine equivalent and decreasing temperature of this mixed solution to 40° C., triethylamine (boiling point: 89° C.) of 20.00 g is added to the mixed solution to raise a neutralization reaction to obtain an N-methylpyrrolidone solution of polyurethane prepolymer. The polyurethane prepolymer of 436.41 g is emulsified by a chain extension reaction caused by dispersing the polyurethane prepolymer in an aqueous solution, which is obtained by dissolving hydrazine 1 hydrate of 7.77 g in water of 543.81 g, using a homodisper to obtain polyurethane resin emulsion E which has solids content of 33 wt %, viscosity of 100 mPa·s (25° C.) and acid equivalent of 1500. Elasticity modulus of a single film of the resin at 25° C. is 20.3 GPa.

In the same raw material and manufacturing process as polyurethane resin A in the manufacture example 1, polyurethane resin Aa with adjusted acid equivalent of 800, polyurethane resin Ab with adjusted acid equivalent of 3500, polyurethane resin Ac with neutralizing agent changed from the triethylamine (boiling point: 89° C.) to 2-amino-2-methyl-1-propanol (boiling point: 165° C.), and polyurethane resin Ad with neutralizing agent changed from the triethylamine to ammonia are manufactured. Then, the manufactured polyurethane resins are mixed with various additives shown in the following Table 1 to obtain metal surface treatment agents.

TABLE 1

Compositions of surface treatment agents: numerical values in parentheses refer to wt % for total solids content in the surface treatment agent.

| Code | Aqueous polyurethane resin | Other resin | Urea group + urethane group (wt % in terms of nitrogen) | Colloidal silica | Additive1 | Crosslinking agent | Solid lubricant | Remark |
|---|---|---|---|---|---|---|---|---|
| a | polyurethane resin A(72) | | 3.3 | colloidal silica F(25) | Phosphate hydrogen 2 ammonium (3) | | | Embodiment |
| b | polyurethane resin B(72) | | 4.5 | colloidal silica F(25) | Phosphate hydrogen 2 ammonium (3) | | | |
| c | polyurethane resin C(72) | | 2.3 | colloidal silica F(25) | Phosphate hydrogen 2 ammonium (3) | | | |
| d | polyurethane resin D(72) | | 6.8 | colloidal silica F(25) | Phosphate hydrogen 2 ammonium (3) | | | |
| e | polyurethane resin A(70) | | 3.3 | colloidal silica F(7) | Phosphate 3 ammonium (5) | crosslinking agent H(18) | | |
| f | polyurethane resin A(70) | | 3.3 | colloidal silica F(9) | Phosphate 3 ammonium (2) + Phosphate hydrogen 2 sodium (1) | crosslinking agent J(18) | | |
| g | polyurethane resin A(69) | | 3.3 | colloidal silica F(15) | Phosphate hydrogen 2 sodium (1) | crosslinking agent H(10) + crosslinking agent K(5) | | |
| h | polyurethane resin A(60) | | 3.3 | colloidal silica F(30) | Phosphate 3 ammonium (5) + Phosphate hydrogen 2 sodium (5) | | | |
| j | polyurethane resin A(63) | | 3.3 | colloidal silica F(25) | Phosphate 2 hydrogen magnesium (12) | | | |
| k | polyurethane resin A(82) | | 3.3 | colloidal silica G(15) | Phosphate 2 hydrogen magnesium (3) | | | |
| m | polyurethane resin A(71) | | 3.3 | colloidal silica F(15) | Phosphate hydrogen 2 ammonium (2) + Phosphate 2 hydrogen magnesium (2) | | polyethylene (10) | |
| n | polyurethane resin A(71) | | 3.3 | colloidal silica F(15) | Phosphate 3 ammonium (2) + Phosphate hydrogen sodium (2) | | polyethylene (10) | |
| p | polyurethane resin A(67) | | 3.3 | colloidal silica F(20) | Phosphate 3 sodium (3) | crosslinking agent K(7) | polyethylene (3) | |
| q | polyurethane resin A(62) | polyolefin resin (10) | 2.8 | colloidal silica F(25) | Phosphate hydrogen 2 ammonium (3) | | | |
| r | polyurethane resin A(40) | polyolefin resin(30) | 1.9 | colloidal silica G(9) | Phosphate 3 ammonium (2) + Phosphate hydrogen 2 sodium (1) | crosslinking agent J(18) | | |

TABLE 1-continued

Compositions of surface treatment agents: numerical values in parentheses refer to wt % for total solids content in the surface treatment agent.

| Code | Aqueous polyurethane resin | Other resin | Urea group + urethane group (wt % in terms of nitrogen) | Colloidal silica | Additive1 | Crosslinking agent | Solid lubricant | Remark |
|---|---|---|---|---|---|---|---|---|
| s | polyurethane resin A(47) | Polyolefin resin(20) | 2.3 | colloidal silica F(20) | Phosphate 3 sodium (3) | crosslinking agent K(7) | polyethylene (3) | |
| a1 | polyurethane resin Aa(72) | | 3.3 | colloidal silica F(25) | Phosphate hydrogen 2 ammonium (3) | | | |
| a2 | polyurethane resin Ab(72) | | 3.3 | colloidal silica F(25) | Phosphate hydrogen 2 ammonium (3) | | | |
| a3 | polyurethane resin Ac(72) | | 3.3 | colloidal silica F(25) | Phosphate hydrogen 2 ammonium (3) | | | |
| a4 | polyurethane resin Ad(72) | | 3.3 | colloidal silica F(25) | Phosphate hydrogen 2 ammonium (3) | | | |
| t | polyurethane resin E(80) | | 15 | colloidal silica F(15) | Phosphate 3 ammonium (5) | | | Comparative Example |
| u | polyurethane resin E(75) | | 15 | colloidal silica F(20) | Phosphate hydrogen 2 sodium (5) | | | |
| v | polyurethane resin A(95) | | 3.3 | — | Phosphate hydrogen 2 sodium (5) | | | |
| w | polyurethane resin A(100) | | 3.3 | — | — | | | |
| x | polyurethane resin A(37) | | 3.3 | colloidal silica F(60) | Phosphate 3 ammonium (2) + Phosphate hydrogen sodium (1) | | | |

Contents of the polyolefin resin, colloidal silica and crosslinking agent in the treatment agents shown in Table 1 are as follows.

Polyolefin resin: HYTEC 3-3121 (available from TOHO Chemical Co., Ltd.)

Colloidal silica F: SNOTEX N (available from NISSAN Chemical Industries, Ltd.)

Colloidal silica G: SNOTEX NS (available from NISSAN Chemical Industries, Ltd.)

Crosslinking agent H: carbodiimide compound; Carbodilite E-03 ((available from NISSHINBO Industries, Inc.)

Crosslinking agent J: oxazoline compound; Epocros WS-700 (available from NIPPON SHOKUBAI Co., Ltd.)

Crosslinking agent K: organic titanate compound; Orgatics TC-400 (available from Matsumoto Fine Chemical Co., Ltd.)

Solid lubricant: polyethylene, Chemipar W500 (Mitsui Chemicals, Inc.)

The following metal material is used as a metal sheet.

L: electric zinc-plated steel sheet; 1.0 mm in sheet thickness, 20 g/m$^2$ in coating weight M: electric zinc-Ni alloy-plated steel sheet; 0.8 mm in sheet thickness, 20 g/m$^2$ in coating weight N: fused zinc-plated steel sheet; 0.9 mm in sheet thickness, 50 g/m$^2$ in coating weight P: fused zinc-iron alloy-plated steel sheet; 0.8 mm in sheet thickness, 45 g/m$^2$ in coating weight Q: fused zinc-11% Al-3% Mg-0.2% Si; 0.8 mm in sheet thickness, 60 g/m$^2$ in coating weight R: fused zinc-55% Al; 0.8 mm in sheet thickness, 75 g/m$^2$ in coating weight S: stainless steel sheet; 0.5 mm in sheet thickness, ferrite stainless steel sheet, steel components: C, 0.008 wt %, Si; 0.07 wt %, Mn; 0.15 wt %, P; 0.011 wt %, S; 0.009 wt %, Al; 0.067 wt %, Cr; 17.3 wt %, Mo; 1.51 wt %, N, 0.0051 wt %, Ti; 0.22 wt %, remnant Fe and unavoidable impurities The metal sheet is alkaline-degreased, washed and dried. The surface treatment agents shown in Table 1 are coated on the dried metal sheet using a bar coater, printing-dried in a hot air drying furnace, and then washed and dried to obtain samples under test. Temperature for the printing dry in the furnace is 300° C. and heating temperature of a reaching plate is 150° C. Details of the samples under test as obtained above are shown in Table 2.

TABLE 2

Contents of coated samples

| | | | | Treated film | | | | |
|---|---|---|---|---|---|---|---|---|
| Division | Number | Steel sheet | Kind | Thickness (μm) | Phosphorus amount (wt %) | Amount of silicon in bond due to urethane resin silanol group * (wt %) | Silicon amount of siliconoxide (wt %) | Sum of silicon in film (wt %) |
| Example | 1 | L | a | 1.2 | 0.8 | 0.8 | 11.7 | 12.5 |
| | 2 | L | b | 1.1 | 0.8 | 0.7 | 11.7 | 12.4 |
| | 3 | L | c | 1.1 | 0.8 | 0.6 | 11.7 | 12.3 |
| | 4 | L | d | 1.0 | 0.8 | 0.9 | 11.7 | 12.6 |
| | 5 | L | e | 1.1 | 1 | 0.8 | 3.3 | 4.1 |
| | 6 | L | f | 1.1 | 0.8 | 0.8 | 4.2 | 5.0 |
| | 7 | L | g | 1.0 | 0.2 | 0.8 | 7.0 | 7.8 |
| | 8 | L | h | 1.1 | 2.1 | 0.7 | 14.0 | 14.7 |
| | 9 | L | j | 1.0 | 3.4 | 0.7 | 11.7 | 12.4 |
| | 10 | L | k | 0.9 | 0.8 | 0.9 | 7.0 | 7.9 |

TABLE 2-continued

Contents of coated samples

| | | | | | | Treated film | | |
|---|---|---|---|---|---|---|---|---|
| Division | Number | Steel sheet | Kind | Thickness (μm) | Phoshorus amount (wt %) | Amount of silicon in bond due to urethane resin silanol group * (wt %) | Silicon amount of siliconoxide (wt %) | Sum of silicon in film (wt %) |
| | 11 | L | m | 1.1 | 0.9 | 0.8 | 7.0 | 7.8 |
| | 12 | L | n | 1.0 | 0.9 | 0.8 | 7.0 | 7.8 |
| | 13 | L | p | 1.2 | 0.6 | 0.8 | 9.3 | 10.1 |
| | 14 | L | q | 1.0 | 0.8 | 0.7 | 11.7 | 12.4 |
| | 15 | L | r | 1.1 | 0.8 | 0.4 | 4.2 | 4.6 |
| | 16 | L | s | 1.0 | 0.6 | 0.5 | 9.3 | 9.8 |
| | 17 | M | a | 1.2 | 0.8 | 0.8 | 11.7 | 12.5 |
| | 18 | M | g | 1.0 | 0.2 | 0.8 | 7.0 | 7.8 |
| | 19 | M | s | 1.1 | 0.6 | 0.5 | 9.3 | 9.8 |
| | 20 | N | a | 1.2 | 0.8 | 0.8 | 11.7 | 12.5 |
| | 21 | N | g | 1.0 | 0.2 | 0.8 | 7.0 | 7.8 |
| | 22 | N | s | 0.9 | 0.6 | 0.5 | 9.3 | 9.8 |
| | 23 | P | a | 1.2 | 0.8 | 0.8 | 11.7 | 12.5 |
| | 24 | P | g | 1.0 | 0.2 | 0.8 | 7.0 | 7.8 |
| | 25 | P | s | 1.0 | 0.6 | 0.5 | 9.3 | 9.8 |
| | 26 | Q | a | 1.2 | 0.8 | 0.8 | 11.7 | 12.5 |
| | 27 | Q | g | 1.0 | 0.2 | 0.8 | 7.0 | 7.8 |
| | 28 | Q | s | 1.1 | 0.6 | 0.5 | 9.3 | 9.8 |
| | 29 | R | a | 1.2 | 0.8 | 0.8 | 11.7 | 12.5 |
| | 30 | R | g | 1.0 | 0.2 | 0.8 | 7.0 | 7.8 |
| | 31 | R | s | 1.0 | 0.6 | 0.5 | 9.3 | 9.8 |
| | 32 | S | a | 1.2 | 0.8 | 0.8 | 11.7 | 12.5 |
| | 33 | S | g | 1.0 | 0.2 | 0.8 | 7.0 | 7.8 |
| | 34 | S | s | 0.9 | 0.6 | 0.5 | 9.3 | 9.8 |
| | 35 | L | h | 2.9 | 0.8 | 0.7 | 14.0 | 14.7 |
| | 36 | L | h | 0.7 | 0.8 | 0.7 | 14.0 | 14.7 |
| | 37 | L | a1 | 1.2 | 0.8 | 0.8 | 11.7 | 12.5 |
| | 38 | L | a2 | 1.2 | 0.8 | 0.8 | 11.7 | 12.5 |
| | 39 | L | a3 | 1.2 | 0.8 | 0.8 | 11.7 | 12.5 |
| | 40 | L | a4 | 1.2 | 0.8 | 0.8 | 11.7 | 12.5 |
| Comparative Example | 41 | L | t | 1.1 | 1 | 0 | 7.0 | 7.0 |
| | 42 | L | u | 1.1 | 1 | 0 | 9.3 | 9.3 |
| | 43 | L | v | 1.1 | 1 | 1.1 | 0.0 | 1.1 |
| | 44 | L | w | 1.0 | 0 | 1.1 | 0.0 | 1.1 |
| | 45 | L | x | 1.0 | 0.8 | 0.4 | 28.0 | 28.4 |

* Bond due to silanol group refers to siloxane bond, dehydration-condensation bond of silanol group and different functional group, and silanol moiety.

The obtained samples under test are evaluated as follows.

(1) Film Adhesion

Grids of size of 1 mm are inscribed in surfaces of the samples using a cutter knife, the samples are extruded by 7 mm using an Erichsen tester so that surfaces of coating films become convex, and then a tape peeling test is performed for the extruded samples. A grid inscription method, an Erichsen extrusion method and a tape peeling method are performed based on methods described in JIS-K5400.8.2 and JIS-K5400.8.5. Evaluation after tape peeling is made with 10 as a perfect score according to example diagrams for evaluation described in JIS-K5400.8.5.

(2) Overcoating Paint Adhesion

Melamine alkyd paints (SuperLac 100, available from Nippon Paint Co., Ltd.) is coated on the surfaces of the samples with a dried film thickness of 20 μm using a bar coater, and then printed at 120° C. for 25 minutes to obtain coated sheets. After being left alone for a day, the obtained coated sheets are digested in boiling water. Then, after leaving the coated sheets alone for a day, 100 grid cut marks with interval of 1 mm are inscribed in surfaces of the coated sheets. After cellophane adhesive tapes (available from Nichiban Co., Ltd.) are attached to and then detached (peeled) from the inscribed surfaces of the coated sheets, film conditions are observed and evaluated according to the following criterions. A grid inscription method and a tape peeling method are performed based on methods described in JIS-K5400.8.2 and JIS-K5400.8.5.

5: Peeling number of 0
4: Peeling number of equal to or less than 5
3: Peeling number of equal to or less than 10
2: Peeling number of equal to or less than 50
1: Peeling number of equal to or more than 51

(3) Solvent Resistance

A rubbing test using ethylmethylketone is made for the surfaces of the samples. A 15 mmϕ-silicon rubber rod with gauze which is fixed to a tip of the rod and contains ethylmethylketone of 5 mL is slid on the surfaces of the samples ten times under load of 4.9 N. After tapes are sealed on edges and rear sides of the samples, a salt spray test (JIS-Z-2371) is made for the samples. After 48 hours, white rust is observed and an evaluation is made according to the following criterions.

5: No white rust
4: White rust of less than 1%
3: White rust of equal to or more than 1% and less than 5%
2: White rust of equal to or more than 5% and less than 20%
1: White rust of more than 20%

(4) Alkali Resistance

The samples are agitated and digested for 2 minutes in an aqueous solution (pH 12.5) which contains an alkaline degreasing agent (SurfCleaner 53, available from Nippon Paint Co., Ltd.) of 2 wt % at 55° C. After tapes are sealed on edges and rear sides of the samples, a salt spray test (JIS-Z-2371) is made for the samples. After 72 hours, white rust is observed and an evaluation is made according to the following criterions.
  5: No white rust
  4: White rust of less than 1%
  3: White rust of equal to or more than 1% and less than 5%
  2: White rust of equal to or more than 5% and less than 20%
  1: White rust of equal to or more than 20%

(5) Corrosion Resistance (i) Flat Board:

A salt spray test (SST) (specified in JIS-Z-2371) is made for flat board samples with their end sides and rear sides being sealed, and after 240 hours, white rust is observed and an evaluation is made according to the following criterions on corrosion resistance.
  5: No white rust
  4: White rust of less than 1%
  3: White rust of equal to or more than 1% and less than 5%
  2: White rust of equal to or more than 5% and less than 20%
  1: White rust of equal to or more than 20%

(ii) Worked Material:

A 7 mm-Erichsen work is made for centers of flat board samples with their end sides and rear sides being sealed, and then, a salt spray test (SST) (specified in JIS-Z-2371) is made for the Erichsen-worked flat board samples. After 120 hours, white rust is observed and an evaluation is made according to the following criterions on corrosion resistance.
  5: No white rust
  4: White rust of less than 1%
  3: White rust of equal to or more than 1% and less than 5%
  2: White rust of equal to or more than 5% and less than 20%
  1: White rust of equal to or more than 20%

(6) Workability and Scratch Resistance

Working oil (Z3 available from Idemitsu Co., Ltd., and G-6231 available from Nihon Kohsakuyu Co., Ltd.) is coated on the samples, and then a square tube deep drawing work is made for the samples. External appearance of the samples after testing is observed and evaluated. A drawing work is made for the samples under conditions of blank diameter of 100 mm, square tube punch width of 50 mm, shoulder R of 5 mm, and crease suppression pressure of 9.8 kN.
  5: No change
  4: Some discolored
  3: Discolored or some scratched
  2: Scratched or some remnants
  1: Scratched or large film peeling

TABLE 3

Test result list

| Division | No. | Overcoating | | | | Corrosion resistance | | Workability · Scratch resistance | | General Evaluation ※ |
|---|---|---|---|---|---|---|---|---|---|---|
| | | Film adhesion | paint adhesion | Solvent resistance | Alkai resistance | Flat board | Worked material | G6231F | Z3 | |
| Example | 1 | 10 | 5 | 4 | 4 | 5 | 4 | 4 | 4 | G |
| | 2 | 10 | 5 | 5 | 5 | 5 | 5 | 4 | 4 | VG |
| | 3 | 10 | 5 | 4 | 4 | 5 | 5 | 4 | 4 | VG |
| | 4 | 10 | 5 | 4 | 5 | 5 | 5 | 4 | 4 | VG |
| | 5 | 10 | 5 | 5 | 5 | 5 | 4 | 4 | 4 | VG |
| | 6 | 10 | 5 | 5 | 5 | 5 | 5 | 4 | 4 | VG |
| | 7 | 10 | 5 | 5 | 5 | 5 | 5 | 4 | 4 | VG |
| | 8 | 10 | 5 | 4 | 4 | 5 | 4 | 4 | 4 | G |
| | 9 | 10 | 5 | 4 | 4 | 5 | 4 | 4 | 4 | G |
| | 10 | 10 | 5 | 4 | 5 | 5 | 4 | 4 | 4 | VG |
| | 11 | 10 | 5 | 4 | 4 | 5 | 5 | 5 | 5 | VG |
| | 12 | 10 | 5 | 4 | 5 | 5 | 5 | 5 | 5 | VG |
| | 13 | 10 | 5 | 5 | 5 | 5 | 5 | 5 | 5 | VG |
| | 14 | 10 | 5 | 4 | 4 | 5 | 5 | 4 | 4 | VG |
| | 15 | 10 | 5 | 5 | 5 | 5 | 5 | 4 | 4 | VG |
| | 16 | 10 | 5 | 5 | 5 | 5 | 5 | 5 | 5 | VG |
| | 17 | 10 | 5 | 4 | 5 | 5 | 4 | 5 | 5 | VG |
| | 18 | 10 | 5 | 5 | 5 | 5 | 4 | 5 | 5 | VG |
| | 19 | 10 | 5 | 5 | 5 | 5 | 5 | 5 | 5 | VG |
| | 20 | 10 | 5 | 4 | 4 | 5 | 4 | 4 | 4 | G |
| | 21 | 10 | 5 | 5 | 5 | 4 | 4 | 4 | 4 | G |
| | 22 | 10 | 5 | 5 | 5 | 5 | 5 | 5 | 5 | VG |
| | 23 | 10 | 5 | 4 | 4 | 4 | 4 | 5 | 5 | G |
| | 24 | 10 | 5 | 5 | 5 | 5 | 4 | 5 | 5 | VG |
| | 25 | 10 | 5 | 5 | 5 | 5 | 4 | 5 | 5 | VG |
| | 26 | 10 | 5 | 4 | 5 | 5 | 4 | 5 | 5 | VG |
| | 27 | 10 | 5 | 5 | 5 | 5 | 4 | 5 | 5 | VG |
| | 28 | 10 | 5 | 5 | 5 | 5 | 5 | 5 | 5 | VG |
| | 29 | 10 | 5 | 4 | 5 | 5 | 4 | 5 | 5 | VG |
| | 30 | 10 | 5 | 5 | 5 | 5 | 4 | 5 | 5 | VG |
| | 31 | 10 | 5 | 5 | 5 | 5 | 5 | 5 | 5 | VG |
| | 32 | 10 | 5 | 4 | 5 | 5 | 5 | 5 | 5 | VG |
| | 33 | 10 | 5 | 5 | 5 | 5 | 5 | 4 | 4 | VG |
| | 34 | 10 | 5 | 5 | 5 | 5 | 5 | 5 | 5 | VG |
| | 35 | 10 | 5 | 5 | 5 | 5 | 5 | 4 | 4 | VG |
| | 36 | 10 | 5 | 4 | 4 | 4 | 4 | 4 | 4 | G |
| | 37 | 10 | 5 | 4 | 4 | 5 | 4 | 4 | 4 | G |
| | 38 | 10 | 5 | 3 | 3 | 5 | 4 | 4 | 4 | GU |
| | 39 | 10 | 5 | 3 | 3 | 5 | 3 | 4 | 4 | GU |
| | 40 | 10 | 5 | 4 | 3 | 5 | 3 | 4 | 4 | GU |

TABLE 3-continued

Test result list

| Division | No. | Overcoating | | | | Corrosion resistance | | Workability · Scratch resistance | | General Evaluation |
| | | Film adhesion | paint adhesion | Solvent resistance | Alkai resistance | Flat board | Worked material | G6231F | Z3 | ※ |
|---|---|---|---|---|---|---|---|---|---|---|
| Comparative Example | 41 | 8 | 4 | 4 | 5 | 4 | 1 | 1 | 1 | NG |
| | 42 | 8 | 4 | 4 | 5 | 4 | 1 | 1 | 1 | NG |
| | 43 | 10 | 3 | 3 | 3 | 2 | 2 | 4 | 4 | U |
| | 44 | 10 | 3 | 3 | 3 | 1 | 1 | 4 | 4 | NG |
| | 45 | 6 | 4 | 5 | 4 | 5 | 2 | 2 | 2 | U |

* Evaluation: VG: very good, G: good, U: usable, and NG: no good

As can be seen from Table 3, comparative examples No. 41 and No. 42 have low workability and low worked material corrosion resistance since they contain too much urea groups and urethane groups of polyurethane resin (in general evaluation in Table 3, "VG" represents "very good", "G" represents "good", "U" represents "usable", and "NG" represents "no good"). No. 42 and No. 43 have relatively low solvent resistance and relatively low corrosion resistance since they do not contain silanol groups. No. 44 has low corrosion resistance since it does not contain silicon oxide although it contains phosphatic compound. No. 35 has low solvent resistance and low corrosion resistance since it contains neither silicon oxide nor phosphatic compound. No. 46 has low film adhesion, low workability and low worked material corrosion resistance since it contains too much silica. For No. 37, the treatment agent is gelled after 7 days at the normal temperature. For the remainders except No. 7, abnormality of external appearance is not observed after 14 days at the normal temperature.

It can be seen that the film configuration of Examples Nos. 1 to 40 gives good film adhesion, overacting paint adhesion, alkali resistance, solvent resistance, corrosion resistance, workability and scratch resistance.

Although a few exemplary embodiments of the present invention have been shown and described, the present invention is not limited to these embodiments. It will be appreciated by those skilled in the art that changes may be made in these embodiments without departing from the principles and spirit of the present invention, the scope of which is defined in the appended claims and their equivalents.

INDUSTRIAL APPLICABILITY

The present invention can provide a surface-treated metal material and a metal surface treatment agent having superior corrosion resistance, overcoating paint adhesion, alkali resistance, solvent resistance and workability.

The invention claimed is:

1. A surface-treated metal material having a film formed on at least a portion of a surface of a metal material, the film containing at least polyurethane resin and silicon oxide, wherein
the polyurethane resin contains one or more of siloxane bond, dehydration-condensation bond of silanol group and different functional group, and silanol moiety, and urea bond, wherein
the sum of the siloxane bond, the dehydration-condensation bond of silanol group and different functional group, total amount of the silanol moiety, and the silicon oxide falls within a range for solids of the film as expressed by the following equation, $$1.6 \text{ wt \%} \leq ((Wa+Wb+Wc+Wd)/W) \times 100 \leq 25 \text{ wt \%}$$

where, W is total weight of solids of the film, Wa is weight of silicon forming the siloxane bond (—Si—O—Si—), Wb is weight of silicon forming the dehydration-condensation bond (—Si—O—R—; R is any element other than Si), Wc is weight of silicon forming the silanol moiety (—Si—OH), and Wd is weight of silicon forming silicon oxide, and wherein
the ratio of the total amount of urea bond and the urethane bond to the total amount of resin components falls within a range as expressed by the following equation, $$0.1 \text{ wt \%} \leq ((Ta+Tb)/T) \times 100 \leq 10 \text{ wt \%}$$

where, T is weight of resin components in solids of the film, Ta is weight of nitrogen forming urea bond (—NH—CO—NH—), and Tb is weight of nitrogen forming urethane bond (—NH—CO—O—).

2. The surface-treated metal material according to claim 1, wherein
a skeleton of the polyurethane resin further contains at least one of a cyclic compound and an aromatic compound.

3. The surface-treated metal material according to claim 2, wherein
the cyclic compound contained in the skeleton of the polyurethane resin is a compound containing one or more of a cyclohexanol group, a cyclopentanol group, an isophorone group and a dicyclohexyl group, and wherein
the aromatic compound contained in the skeleton of the polyurethane resin is a compound containing one or more of a bisphenol group, a crezole group and a diphenyl group.

4. The surface-treated metal material according to claim 1, wherein
the film containing the polyurethane resin further contains a polyolefin resin of equal to or more than 5 wt % and equal to or less than 40 wt %.

5. The surface-treated metal material according to claim 1, wherein
the film containing the polyurethane resin further contains a phosphatic compound of equal to or more than 0.1 wt % and equal to or less than 10 wt % in terms of phosphorus.

6. The surface-treated metal material according to claim 1, wherein
the film containing the polyurethane resin further contains one or more selected from a group consisting of a carbodiimide group-containing compound, an oxazoline group-containing compound and a titanium compound.

7. The surface-treated metal material according to claim 1, wherein
the film containing the polyurethane resin has an elasticity modulus of equal to or more than 0.5 GPa and equal to or less than 20 GPa at 25° C.

8. The surface-treated metal material according to claim 1, further containing a lubricant of equal to or more than 1 wt % and equal to or less than 40 wt % in terms of solids of the film.

9. A metal surface treatment agent containing polyurethane resin and silicon oxide, wherein
the polyurethane resin contains one or more of siloxane bond, dehydration-condensation bond of silanol group and different functional group, and silanol moiety, and urea bond,
wherein the sum of the siloxane bond, the dehydration-condensation bond of silanol group and different functional group, total amount of the silanol moiety, and the silicon oxide falls within a range for solids of the metal surface treatment agent as expressed by the following equation, $$1.6 \text{ wt \%} \leq ((Wa+Wb+Wc+Wd)/W) \times 100 \leq 25 \text{ wt \%}$$

where, W is total weight of solids of the film, Wa is weight of silicon forming the siloxane bond (—Si—O—Si—), Wb is weight of silicon forming the dehydration-condensation bond (—Si—O—R—; R is any element other than Si), Wc is weight of silicon forming the silanol moiety (—Si—OH), and Wd is weight of silicon forming silicon oxide, and wherein
the ratio of the total amount of urea bond and urethane bond to the total amount of resin components falls within a range as expressed by the following equation, $$0.1 \text{ wt \%} \leq ((Ta+Tb)/T) \times 100 \leq 10 \text{ wt \%}$$

where, T is weight of resin components in solids of the film, Ta is weight of nitrogen forming urea bond (—NH—CO—NH—), and Tb is weight of nitrogen forming urethane bond (—NH—CO—O—).

10. The metal surface treatment agent according to claim 9, wherein
a skeleton of the polyurethane resin further contains at least one of a cyclic compound and an aromatic compound.

11. The metal surface treatment agent according to claim 10, wherein
the cyclic compound contained in the skeleton of the polyurethane resin is a compound containing one or more of a cyclohexanol group, a cyclopentanol group, an isophorone group and a dicyclohexyl group; and
the aromatic compound contained in the skeleton of the polyurethane resin is a compound containing one or more of a bisphenol group, a crezole group and a diphenyl group.

12. The metal surface treatment agent according to claim 9, wherein
the polyurethane resin is water-dispersible or water-soluble and contains a carboxyl group or a sulfonic acid group.

13. The metal surface treatment agent according to claim 12, wherein
the polyurethane resin has an acid equivalent of 1000 to 3000.

14. The metal surface treatment agent according to claim 12, wherein
a neutralizing agent for water dispersion of the polyurethane resin is alkanol amine.

15. The metal surface treatment agent according to claim 12, wherein
a boiling point of a neutralizing agent for water dispersion of the polyurethane resin is equal to or less than 150° C.

16. The metal surface treatment agent according to claim 9, further containing a polyolefin resin of equal to or more than 5 wt % and equal to or less than 40 wt % for total amount of nonvolatile solids.

17. The metal surface treatment agent according to claim 9, further containing a phosphatic compound of equal to or more than 0.1 wt % and equal to or less than 10 wt % in terms of phosphorus for total amount of film solids.

18. The metal surface treatment agent according to claim 17, wherein
the phosphatic compound is phosphate of one or more selected from a group consisting of ammonia, sodium, calcium and magnesium.

19. The metal surface treatment agent according to claim 9, further containing, as a crosslinking agent of the polyurethane resin, one or more selected from a group consisting of a carbodiimide group-containing compound, an oxazoline group-containing compound and an organic titanate compound.

20. The metal surface treatment agent according to claim 9, further containing a lubricant of equal to or more than 1 wt % and equal to or less than 40 wt % for total amount of nonvolatile solids.

* * * * *